United States Patent Office 3,556,761
Patented Jan. 19, 1971

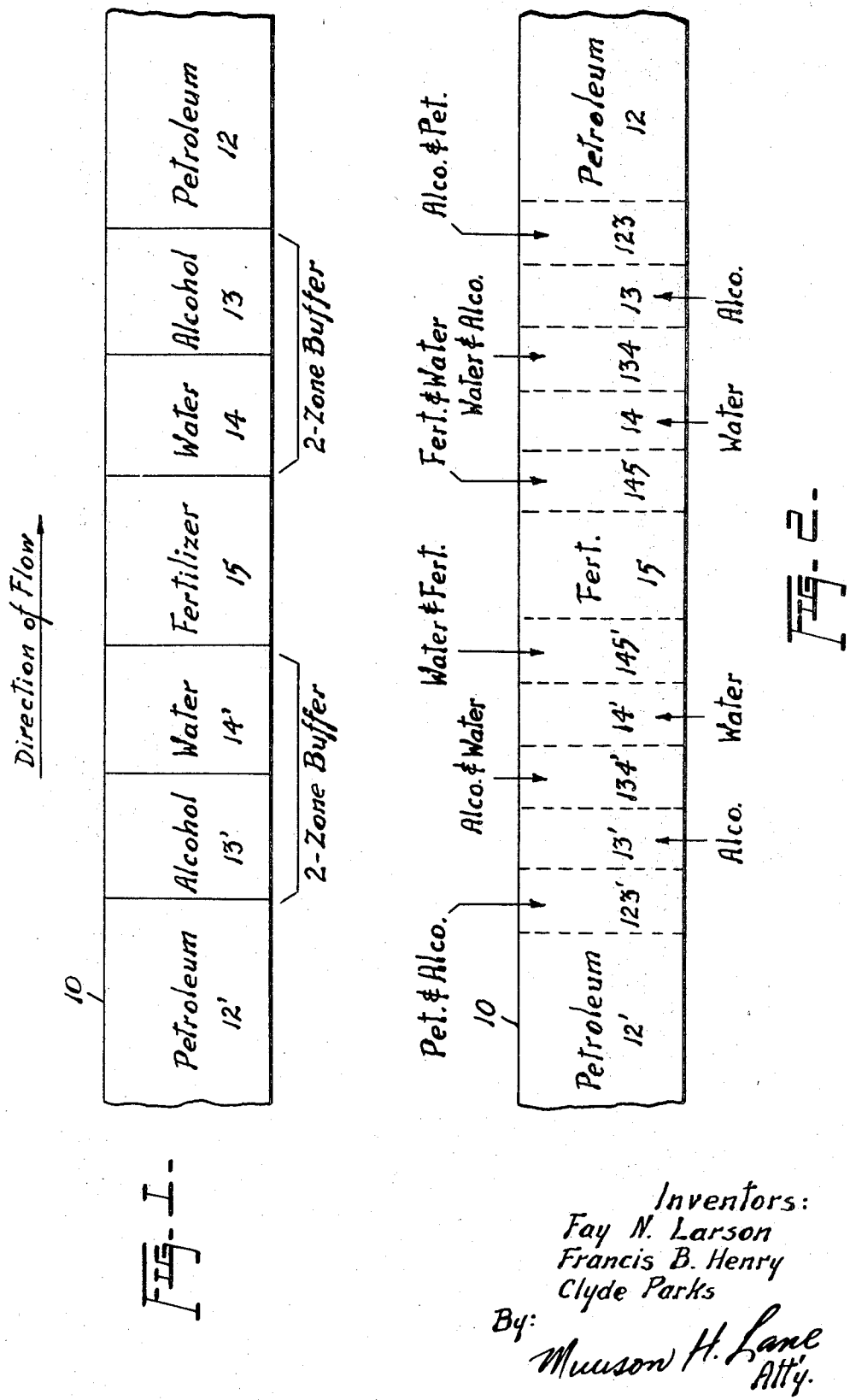

3,556,761
PIPELINE TRANSPORTATION OF IMMISCIBLE FLUIDS
Fay N. Larson and Francis B. Henry, Tulsa, Okla., and Clyde Parks, New York, N.Y., assignors, by mesne assignments, to Williams Brothers Company, a corporation of Delaware
Filed Nov. 30, 1967, Ser. No. 687,048
Int. Cl. C05g 3/00
U.S. Cl. 71—1                                              11 Claims

ABSTRACT OF THE DISCLOSURE

A method of transporting by pipeline two immiscible fluids such as a petroleum product and a fertilizer solution. The two fluids are separated by a two-zone liquid buffer, the zones of which are soluble in the respective fluids and also one in the other, as for example, acetone or alcohol and water.

---

This invention relates to new and useful improvements in the art of simultaneously transporting by pipeline two immiscible fluids for which there is no acceptable common solvent and compatible material available for use as a buffer for separating the fluids in the pipeline.

More particularly, the principal object of the invention is to facilitate efficient and economical pipeline transportation of two or more such fluids which, in the absence of a common soluble buffer which is also compatible with the pertinent fluid, heretofore could not be transported simultaneously by pipeline, as for example, petroleum products and fertilizer solutions, with which this invention is specifically concerned.

As such, the invention provides a new method whereby two different fluids passing through a pipeline are separated by a two-zone liquid buffer, the zones of which are soluble in and compatible with the respective fluids and also one in the other. As a result, buffer liquid and fluid mixtures are obtained at interfaces of the fluids and buffer zones, whereby the two fluids are separated without stratification, overriding or underriding, and pure product specifications of the fluids are preserved.

More specifically, in the given example of simultaneous pipeline transportation of a petroleum product and a fertilizer solution, the two-zone liquid buffer consists of a buffer zone of acetone or alcohol which interfaces and is soluble in and compatible with the petroleum product, and a buffer zone of water which interfaces and is soluble in and compatible with the fertilizer solution, the acetone or alcohol being soluble in water at the interface of the two buffer zones. Thus, three interfacial mixtures are obtained between the petroleum product, acetone or alcohol, water and the fertilizer solution, and the multiple-zone buffer of the invention facilitates transportation of petroleum product and fertilizer solution.

Other objects, features and advantages of the invention will become apparent from the following description taken in conjunction with the accompanying drawings, wherein:

FIG. 1 is a diagrammatic illustration showing the flow of two different fluids separated by buffer zones in a pipeline; and FIG. 2 is a similar view of the fluids and buffer zones with interfacial mixtures at the end of the pipeline transportation.

Referring now to the accompanying drawings in detail, FIG. 1 shows a pipeline 10 used in accordance with the invention for simultaneous transportation of two immiscible fluids for which there is no acceptable common soluble material having the necessary compatibility available to use as a buffer. In the specific example given, one of such fluids is a petroleum product, while the other is a liquid fertilizer solution, as for example a nitrogen fertilizer solution which may be of the type known commercially as "URAN-32" or "POLY-N." The direction of flow in the pipeline is shown by the arrow at the top of FIG. 1.

In practicing the method of the invention, the petroleum product is first introduced into the pipeline as indicated at 12, and this is followed by the first zone 13 of a two-zone buffer, the buffer zone 13 consisting of anhydrous isopropyl alcohol which is soluble in and compatible with the petroleum product 12.

The second zone 14 of a two-zone buffer which follows zone 13, consists of water, which precedes and is soluble in and compatible with the liquid fertilizer solution 15, the latter being introduced into the pipeline after the two-zone buffer. It is to be noted that the alcohol in the first buffer zone 13 is soluble not only in the petroleum product 12, but also in the water of the second buffer zone 14.

By the time the end of pipeline transportation is reached as shown in FIG. 2, some mixing will have occurred at the interfaces of the various liquids. Thus, there will be a mixture of alcohol and petroleum at the interface of the petroleum product 12 and the first buffer zone 13, as indicated at 123. At the interface of the two buffer zones 13 and 14 there will be a mixture of water and alcohol, as indicated at 134. Similarly, at the interface of the second buffer zone 14 and the fertilizer solution 15 there will be a mixture of fertilizer and water, as indicated at 145. However, batches of pure alcohol and pure water will remain at 13 and 14, respectively, between the mixtures 123–134 and 134–145 respectively, and moreover, the two immiscible fluids, that is, the petroleum product 12 and the fertilizer solution 15 will remain totally separated by the multiple buffer and contamination of either by the other will not occur.

The amount of alcohol and water included in the multiple buffer is predetermined in relation to the distance of transport and pipeline characteristics, so that batches of pure alcohol and pure water remain as aforesaid, by the time the end of the pipeline is reached.

Also, the concentration of the fertilizer solution may be predetermined before transportation, so that after being diluted by some of the water in the buffer zone 14, the concentration is at the desired level when it reaches the end of the pipeline. The petroleum 12 at the end of the pipeline is, of course, pure, and the petroleum-alcohol mixture 123 may be segregated and sold as a lower petroleum grade. The pure water, pure alcohol and the water-alcohol mixture 134 may be separated at the end of the pipeline and reused as a buffer on subsequent occasions.

If the transport of the fertilizer solution 15 is to be followed by another batch of petroleum as indicated at 12' in FIG. 1, another two-zone buffer is introduced into the pipeline after the fertilizer 15 and before the petroleum 12'. The water zone 14' of this buffer follows the fertilizer and the alcohol zone 13' precedes the petroleum, so that again some mixing takes place at the interfaces as indicated at 123', 134' and 145' in FIG. 2.

It will be understood that the continuity of flow as shown in the drawings may be extended ad infinitum and that the drawings are primarily intended to illustrate the two-zone buffers between two immiscible fluids, such as the fluids 12 or 12' and 15.

In the context of the foregoing, the two-zone buffer with its three interfacial mixtures is regarded as separating two immiscible fluids, the two zones of the buffer being soluble in and compatible with the respective fluids and also one in the other. However, from another viewpoint, each of the immiscible fluids may be regarded as being interposed between two buffer zones which are soluble in and compatible with that fluid, with the trailing buffer zone of one fluid being at interface with the leading buffer zone of the second fluid so that a mixture is obtained at the interface of the trailing and leading buffer zones. For example, the petroleum fluid 12 may be viewed as being interposed between a leading alcohol buffer zone 13' and a trailing alcohol buffer zone 13, the fertilizer fluid 15 being interposed between a leading water buffer zone 14 and a trailing water zone 14', with the trailing alcohol zone 13 of the petroleum fluid being at interface with the leading water zone 14 of the fertilizer.

While in the foregoing there has been described and shown the preferred method of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. A method of simultaneously transporting by pipeline two immiscible fluids having no acceptable common solvent, said method comprising the steps of (a) introducing the first of said fluids in a pipeline; (b) following the first fluid by a buffer zone of liquid which is soluble in and compatible with the first fluid but not with the second; (c) following the first buffer zone by a second buffer zone of another liquid which is soluble in and compatible with the second of said fluids but not with the first and in which the liquid of the first buffer zone is also soluble; and (d) following the second buffer zone by the second of said fluids.

2. The method as defined in claim 1 which is further characterized in that there are separate mixtures at the interface of the respective buffer zones and fluids and at the interface of the buffer zones.

3. The method as defined in claim 1 which is further characterized in that the first of said fluids is a petroleum product and the first of said buffer zones is alcohol, the second of said zones being water.

4. The method as defined in claim 1 which is further characterized in that the first of said fluids is a petroleum product and the first of said buffer zones is acetone, the second of said buffer zones being water.

5. The method as defined in claim 3 which is further characterized in that the second of said fluids is a liquid fertilizer solution.

6. A method of simultaneously transporting by pipeline two immiscible fluids having no acceptable common solvent, said method comprising the steps of (a) interposing the first of said fluids between buffer zones of liquid which is soluble in and compatible with the first fluid but not with the second; (b) interposing the second of said fluids between buffer zones of another liquid which is soluble in and compatible with the second fluid but not with the first and in which the buffer zone liquid of the first fluid is also soluble; and (c) following the trailing buffer zone of the first fluid by the leading buffer zone of the second fluid at interface.

7. The method as defined in claim 6 which is further characterized in that there are separate mixtures at the interface of the respective fluids and further zones and at the interface of the trailing and leading buffer zones.

8. The method as defined in claim 6 which is further characterized in that the first of said fluids is a petroleum product and the buffer zones thereof are alcohol, the buffer zones of the second fluid being water.

9. The method as defined in claim 8 which is further characterized in that the second of said fluids is a liquid fertilizer solution.

10. A method of simultaneously transporting by pipeline a plurality of immiscible fluids having no acceptable common solvent, which comprises interposing between each successive fluid a multiple-zone liquid buffer, each of said buffer zones being soluble in and compatible with the adjacent fluid and with the liquid of the adjacent buffer zone but being insoluble in the fluid separated therefrom by another buffer zone.

11. The method as defined in claim 10 which is further characterized in that said immiscible fluids are a petroleum product and a liquid fertilizer solution, and the zones of said buffer are alcohol and water.

References Cited

UNITED STATES PATENTS 3,198,201   8/1965   Every et al. _____ 137—1

JAMES L. DE CESARE, Primary Examiner

U.S. Cl. X.R.

137—1